(12) United States Patent
Wu (10) Patent No.: US 7,399,007 B2
(45) Date of Patent: Jul. 15, 2008

(54) TUBE CLIP STRUCTURE

(75) Inventor: Ming-Tien Wu, Tainan (TW)

(73) Assignee: Highlight Tech Corp., Tainan (TW)

( * ) Notice: Subject to any disclaimer, the term of this patent is extended or adjusted under 35 U.S.C. 154(b) by 330 days.

(21) Appl. No.: 11/233,135

(22) Filed: Sep. 23, 2005

(65) Prior Publication Data

US 2007/0069519 A1    Mar. 29, 2007

(51) Int. Cl.
*F16L 25/00* (2006.01)
(52) U.S. Cl. ........................... 285/420; 24/23 B
(58) Field of Classification Search ............ 285/409, 285/420, 311; 24/270, 23 B, 24, 28
See application file for complete search history.

(56) References Cited

U.S. PATENT DOCUMENTS 3,097,410 A * 7/1963 Lincoln ............... 24/270
4,573,717 A * 3/1986 Peacock ............... 285/409
6,050,615 A * 4/2000 Weinhold ............. 285/409

* cited by examiner

*Primary Examiner*—Aaron M Dunwoody
(74) *Attorney, Agent, or Firm*—Leong C. Lei

(57) ABSTRACT

A tube clip structure is disclosed. The clip structure comprises a lower clipping body, an upper clipping body, a pulling plate, an elastic member, the internal side of the lower clipping body being a lower clipping ring for firmly mounting on the protruded edge of a tube body and the internal side of the upper clipping ring for firmly mounting on the protruded edge of a tube body, and a clipping body pivoted rod connecting the upper clipping body and the lower clipping body being used to form an actuating body which can be closed and opened, and the other side end of the upper clipping body being provided with an upper pivotal slot, characterized in that the upper pivotal slot is provided with a pulling plate having a pivotal block which is connected by the pulling plate, and the side of the pulling plate pivot is the elastic member connected to the lower end of the pulling plate by the pulling plate peg so as to allow a fastening rod to mount to a lower fastening slot at the lower end of the lower clipping body, thereby the upper and lower clipping body clip and secure the pulling plate.

1 Claim, 11 Drawing Sheets

TUBE CLIP STRUCTURE

BACKGROUND OF THE INVENTION (a) Technical Field of the Invention

The present invention relates to a tube clip, and in particular, a clip which could effectively and rapidly fasten or release the edge of a tube body.

(b) Description of the Prior Art

Figure 1:
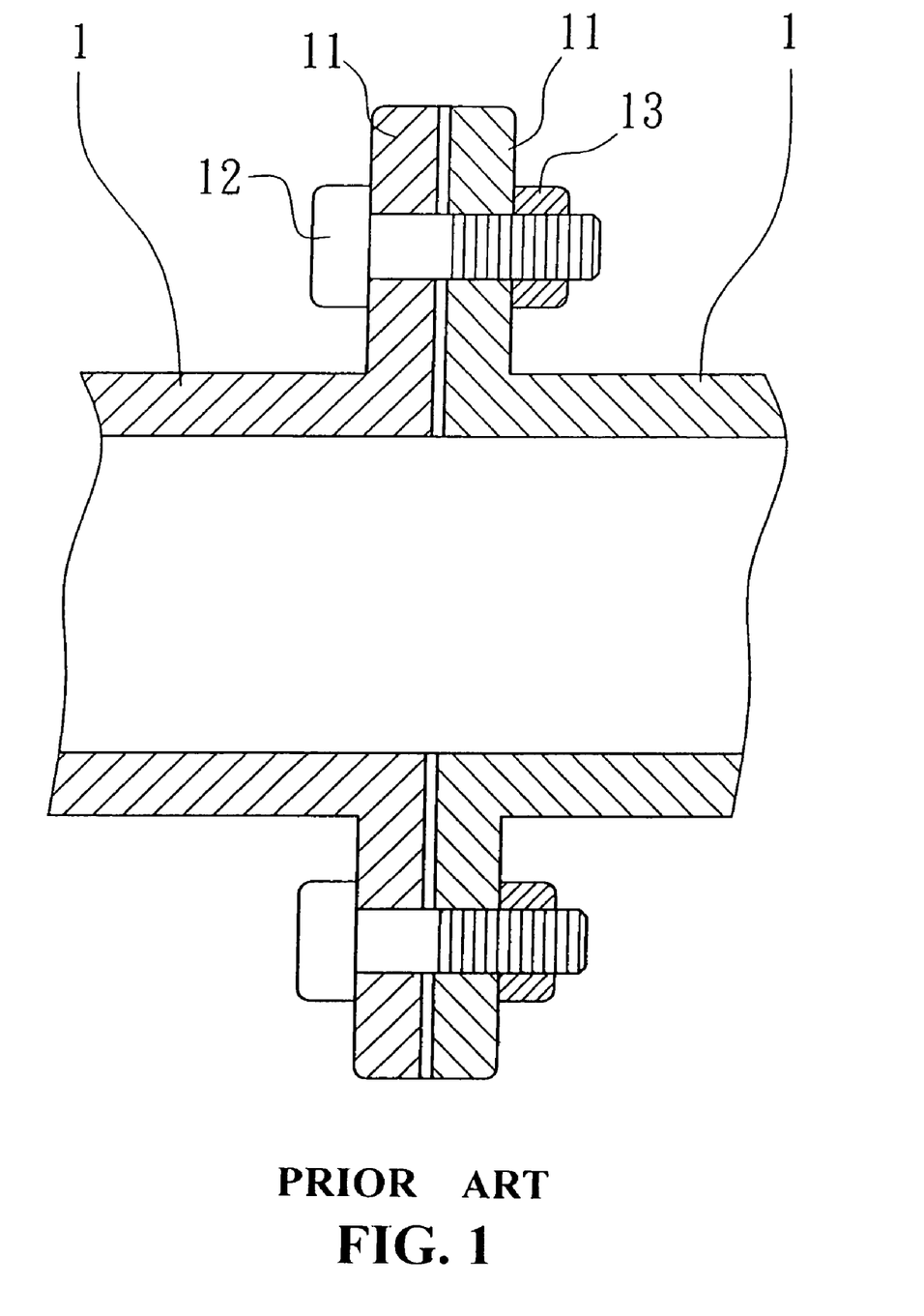
FIG. 1 is a schematic view of a conventional tube connector.

FIG. 1 schematically shows a conventional tube body connection when a separate unit of a tube body 1 is to be connected to another one, generally, a protruded edge 11 is provided at the end of the tube body 1, and the protruded edge 1 is provided with hole. A bolt 12 and a nut 13 are used to fasten the connection of the tube body 1. The drawback of such conventional design is that the height of the protruded edge 1 has to be increased and more holes have to be provided to the protruded edge 11. Thus, precision and accuracy have to be observed.

Figure 2:
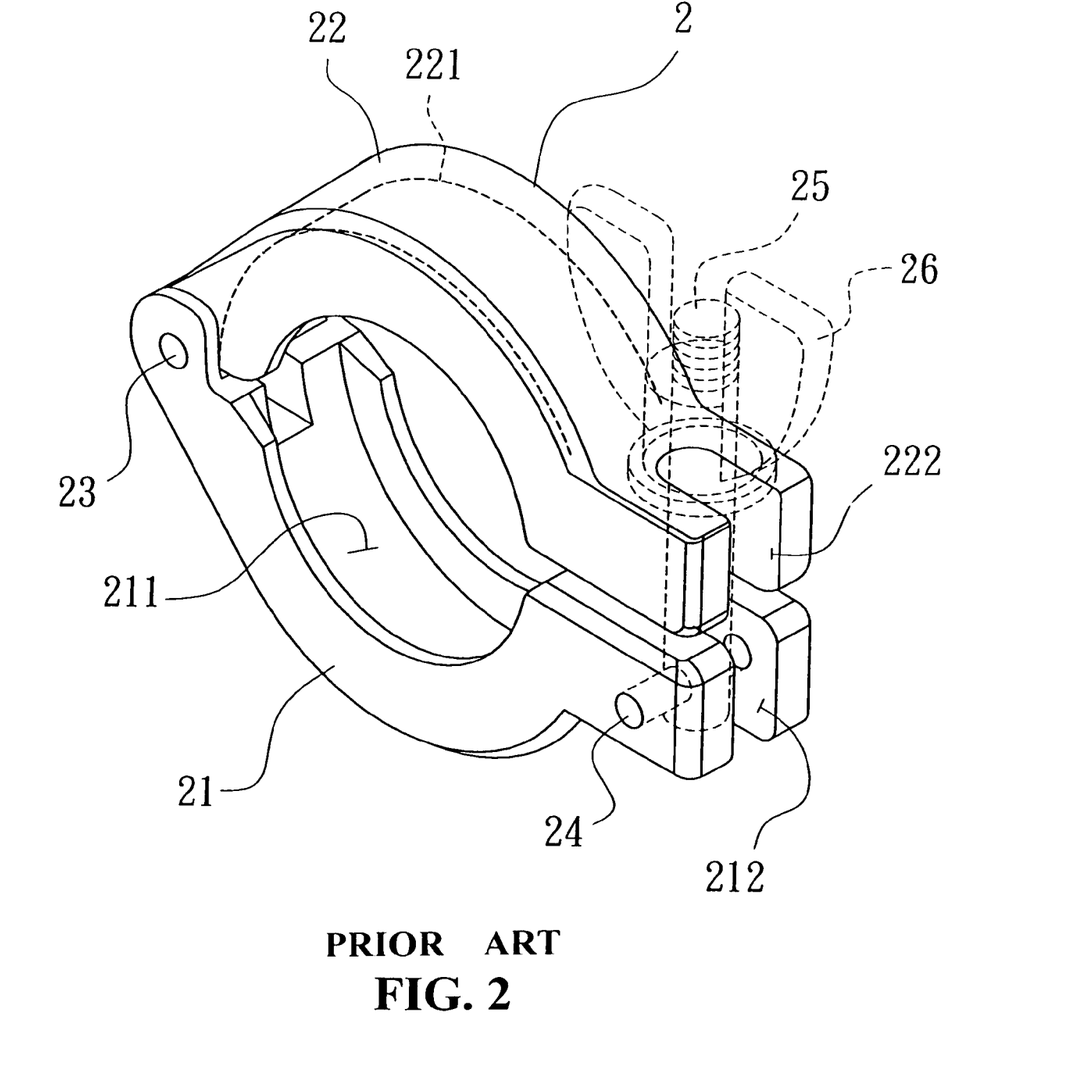
FIG. 2 is a perspective view of a conventional tube clip.
Figure 3:
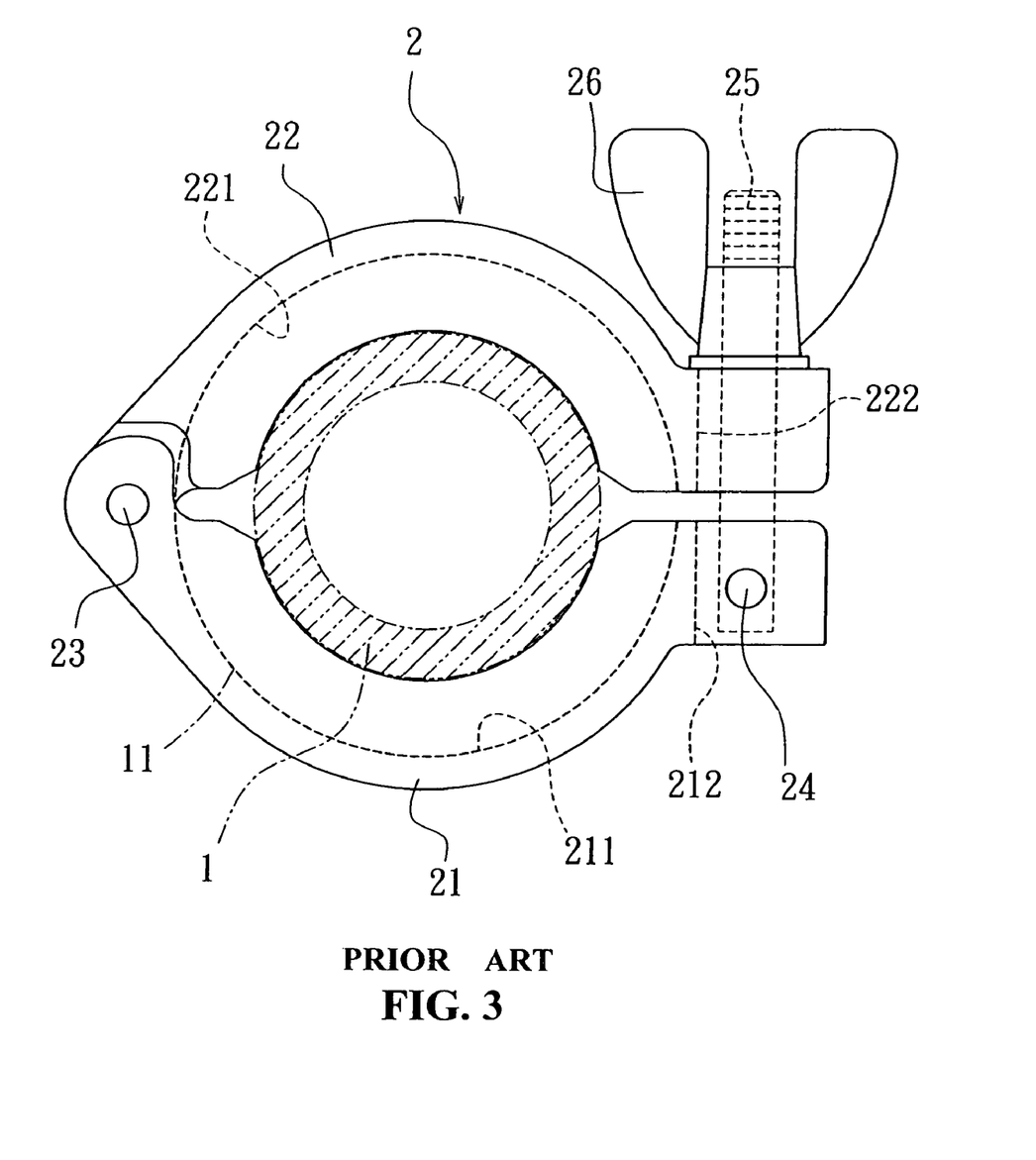
FIG. 3 is a side view of a conventional tube clip.
Figure 4:
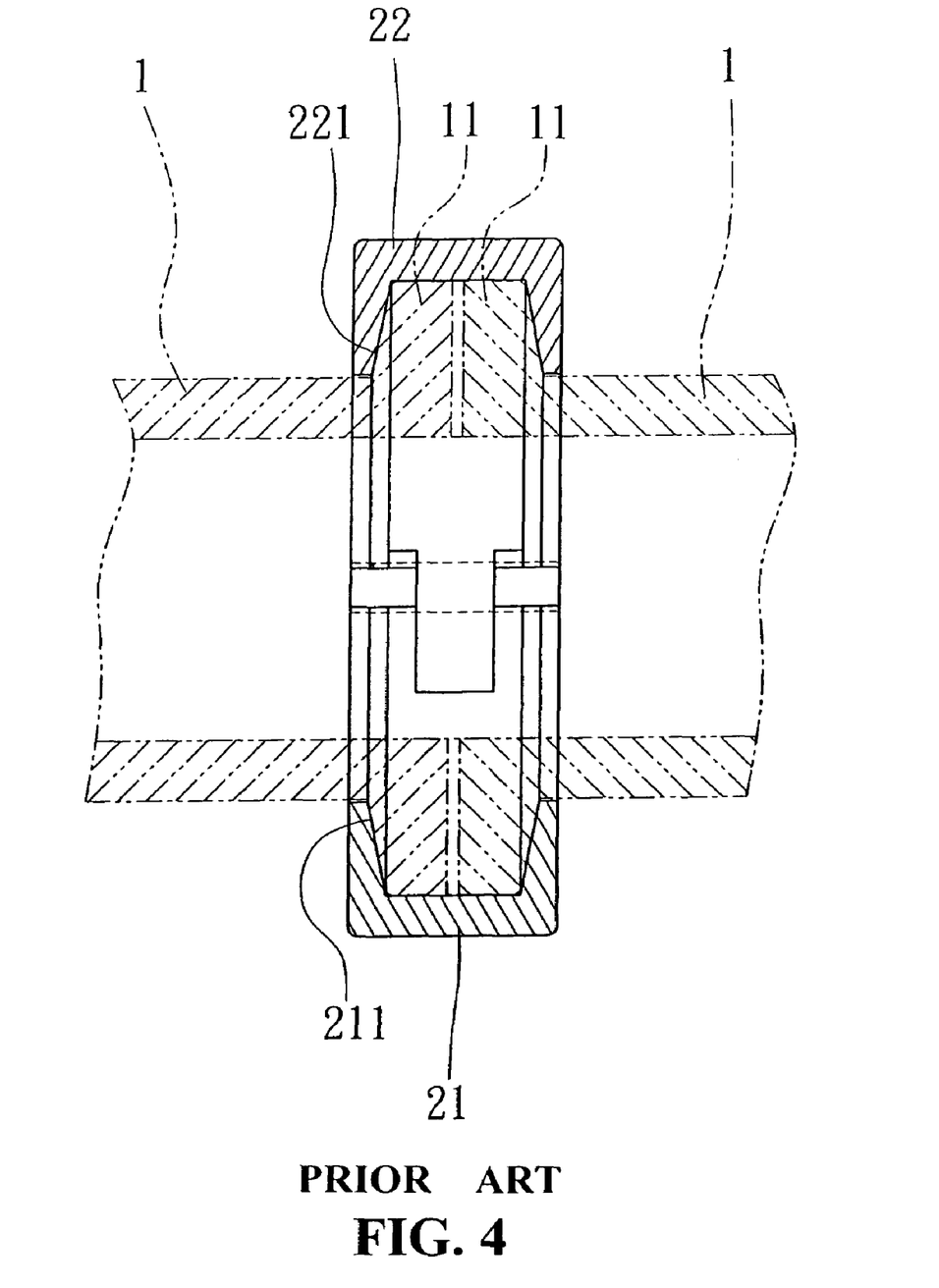
FIG. 4 is a sectional view of a conventional tube clip.
Figure 5:
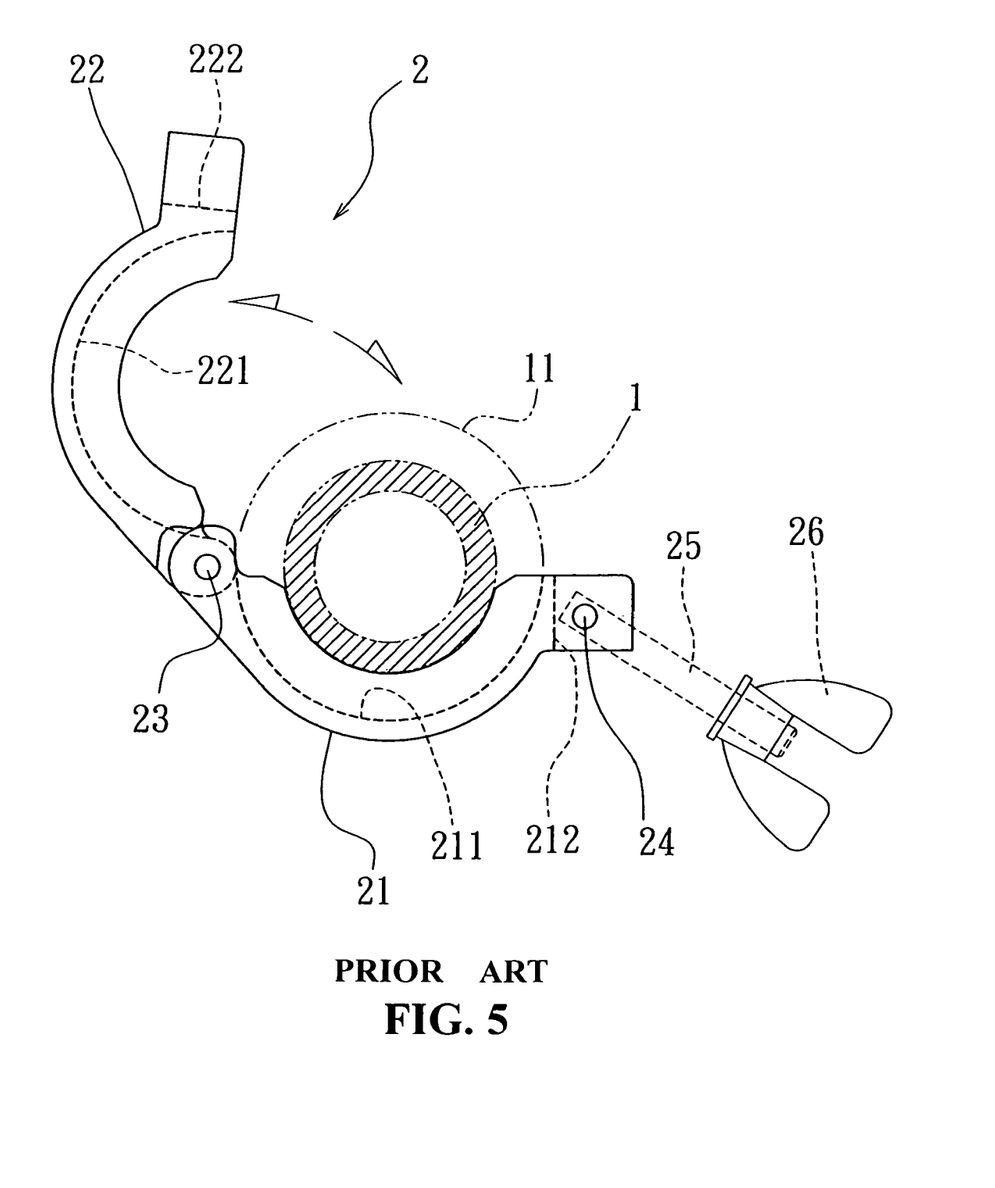
FIG. 5 is a schematic view showing the opening of the conventional clip tube.
Figure 6:
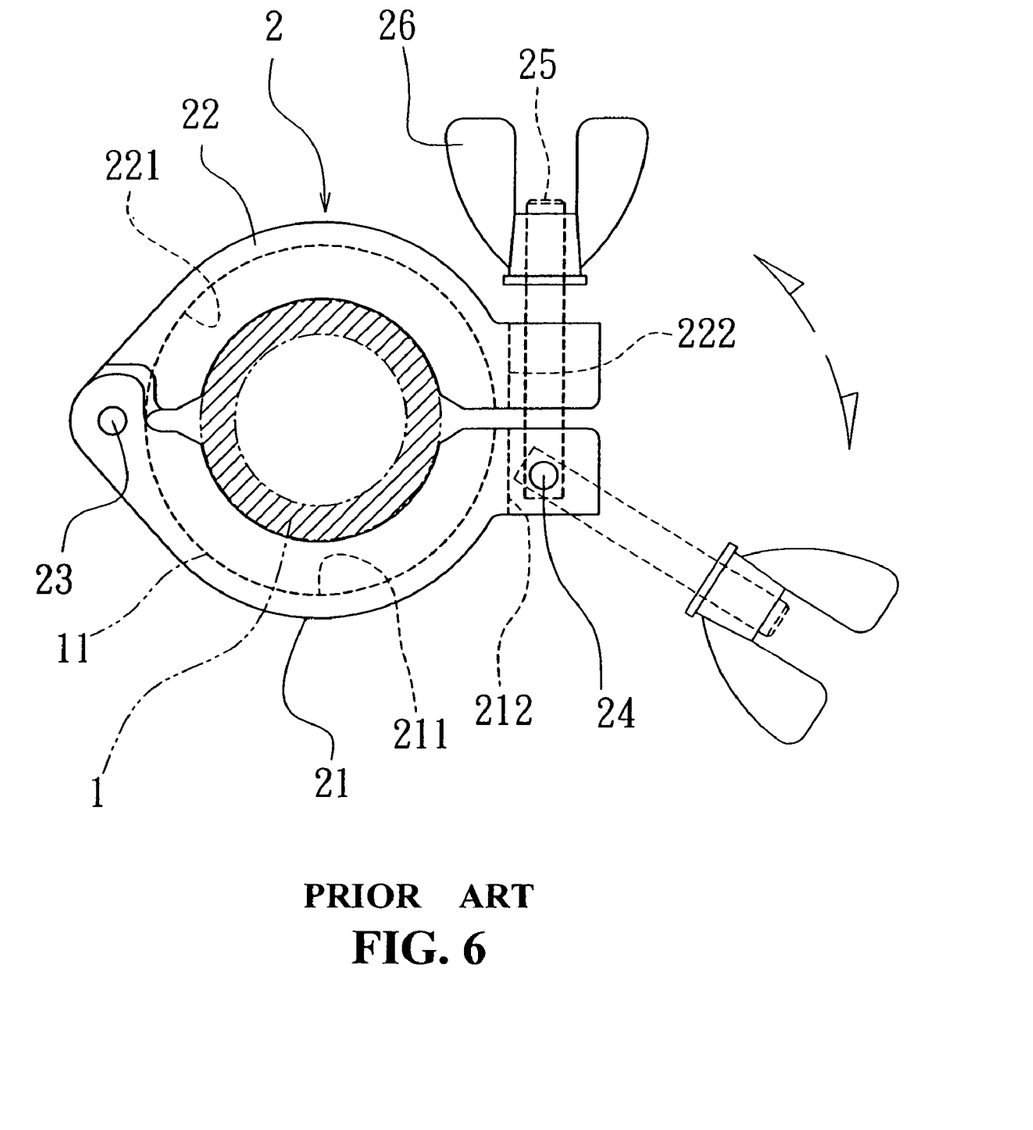
FIG. 6 is a schematic view showing the releasing of the conventional clip tube.

As shown in FIGS. 2 to 6, there is shown a conventional tube clip 2 comprising a tube clip body 21, an upper clip body 22, and screw rod 25. For connection or closing of the tube clip 2, as shown in FIG. 2, the lower and the upper clip body 21, 22 are closed, and the screw rod 25 is upwardly reversed onto the upper pivot slot 222 of the upper clip body 222, and a screw nut 26 is depressed. As shown in FIGS. 3 and 4, the conventional clip 2, the lower and the upper clip body 21, 22 are opened to allow the lower clip ring 211 to be inserted into the tube body 1. The drawback of the conventional tube clip is that the rotating of the screw nut is done manually is laborious and it is difficult to operate, and the longevity is limited.

SUMMARY OF THE INVENTION

The primary purpose of the present invention is to provide a tube clip having a lower clipping body, an upper clipping body, a pulling plate, an elastic member, the internal side of the lower clipping body being a lower clipping ring for firmly mounting on the protruded edge of a tube body and the internal side of the upper clipping ring for firmly mounting on the protruded edge of a tube body, and a clipping body pivoted rod connecting the upper clipping body and the lower clipping body being used to form an actuating body which can be closed and opened, and the other side end of the upper clipping body being provided with an upper pivotal slot, characterized in that the upper pivotal slot is provided with a pulling plate having a pivotal block which is connected by the pulling plate, and the side of the pulling plate pivot is the elastic member connected to the lower end of the pulling plate by the pulling plate peg so as to allow a fastening rod to mount to a lower fastening slot at the lower end of the lower clipping body, thereby the upper and lower clipping body clip and secure the pulling plate.

Yet still another object of the present invention is to provide a tube clip, wherein the elastic member further comprises fastening plates and elastic body, alternately and correspondingly arranged.

Still another object of the present invention is to provide a tube clip structure, wherein the elastic member is urged to be supported and therefore the lower and upper clipping body are fastened and the pulling plate is secured.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 7:
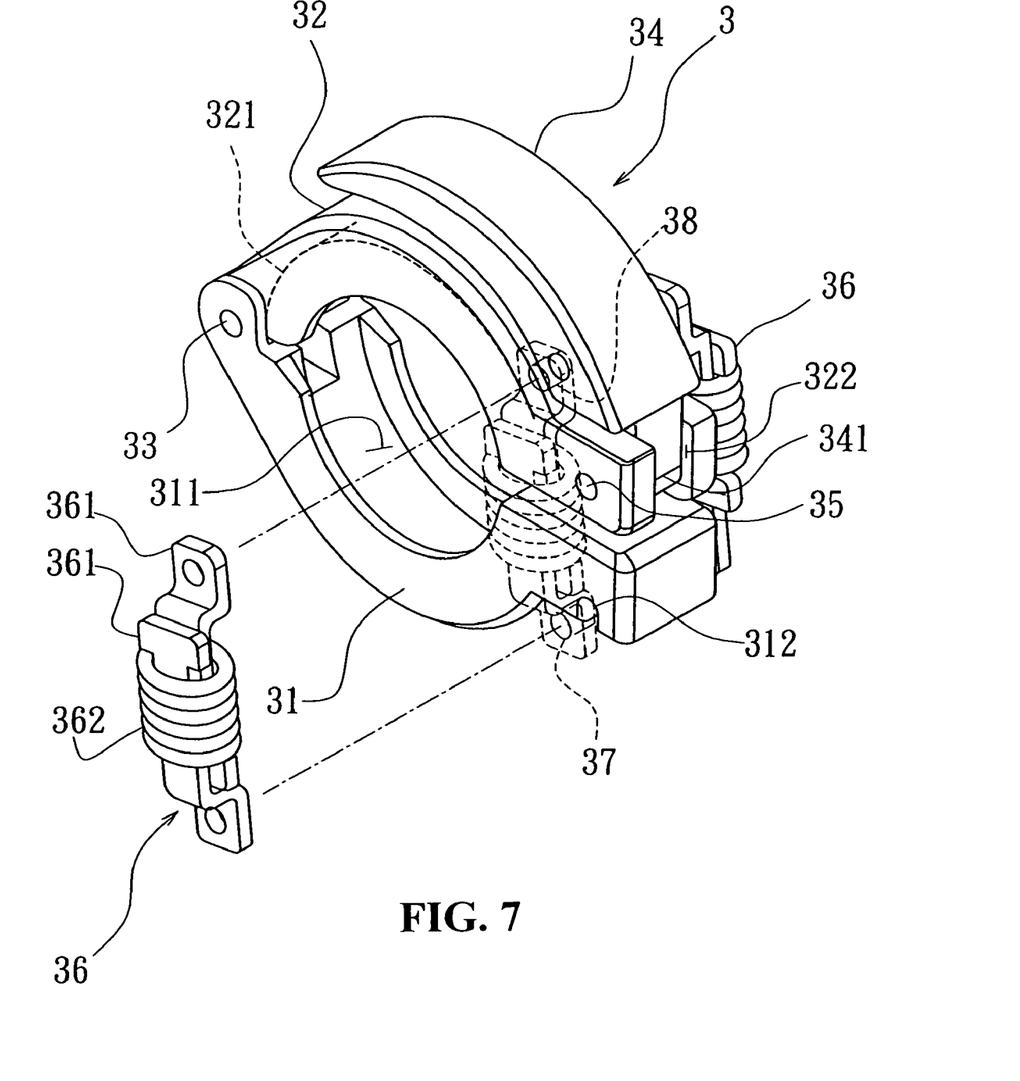
FIG. 7 is a perspective view of the tube clip of the present invention.
Figure 8:
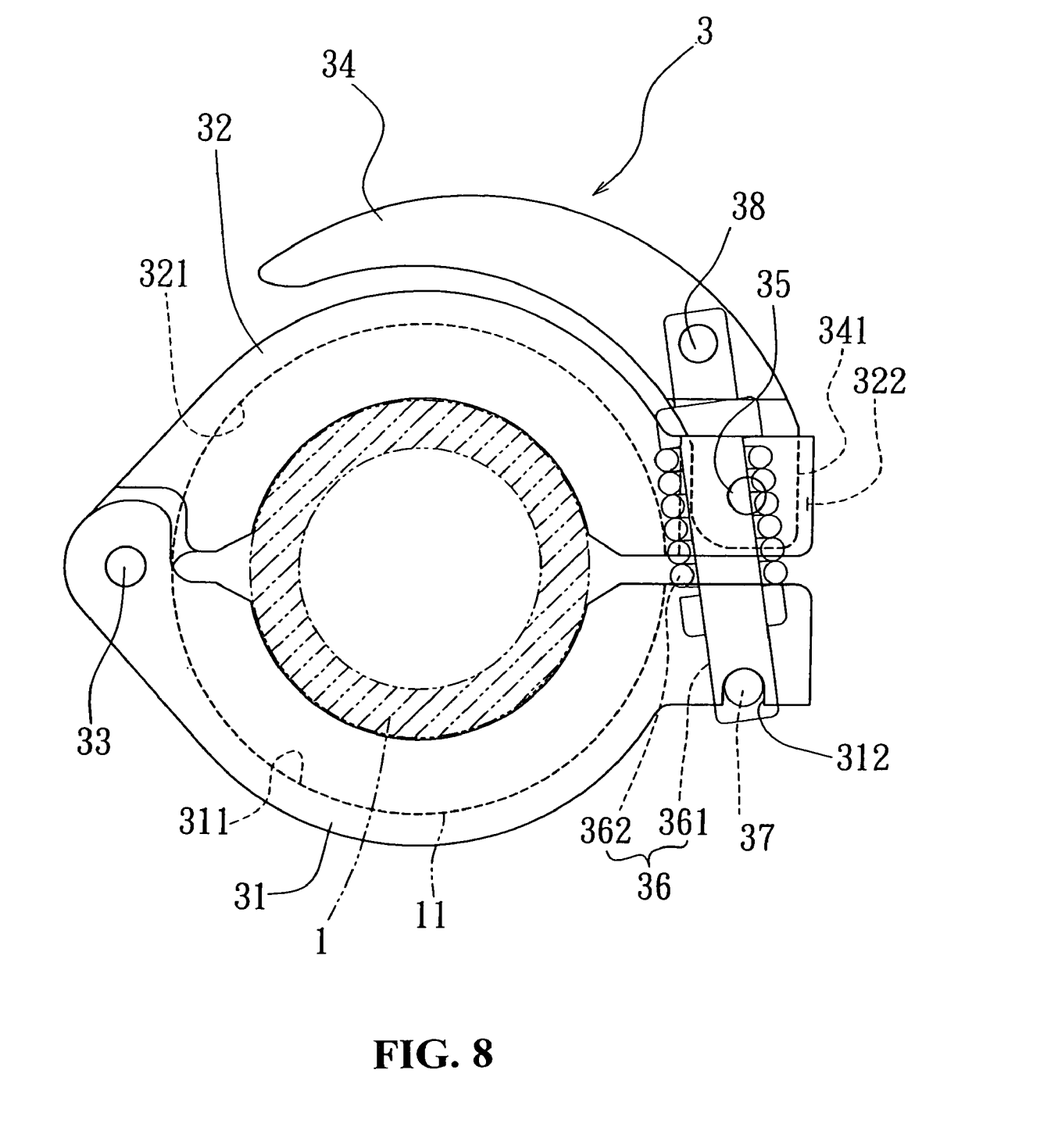
FIG. 8 is a side view of the tube clip of the present invention.
Figure 9:
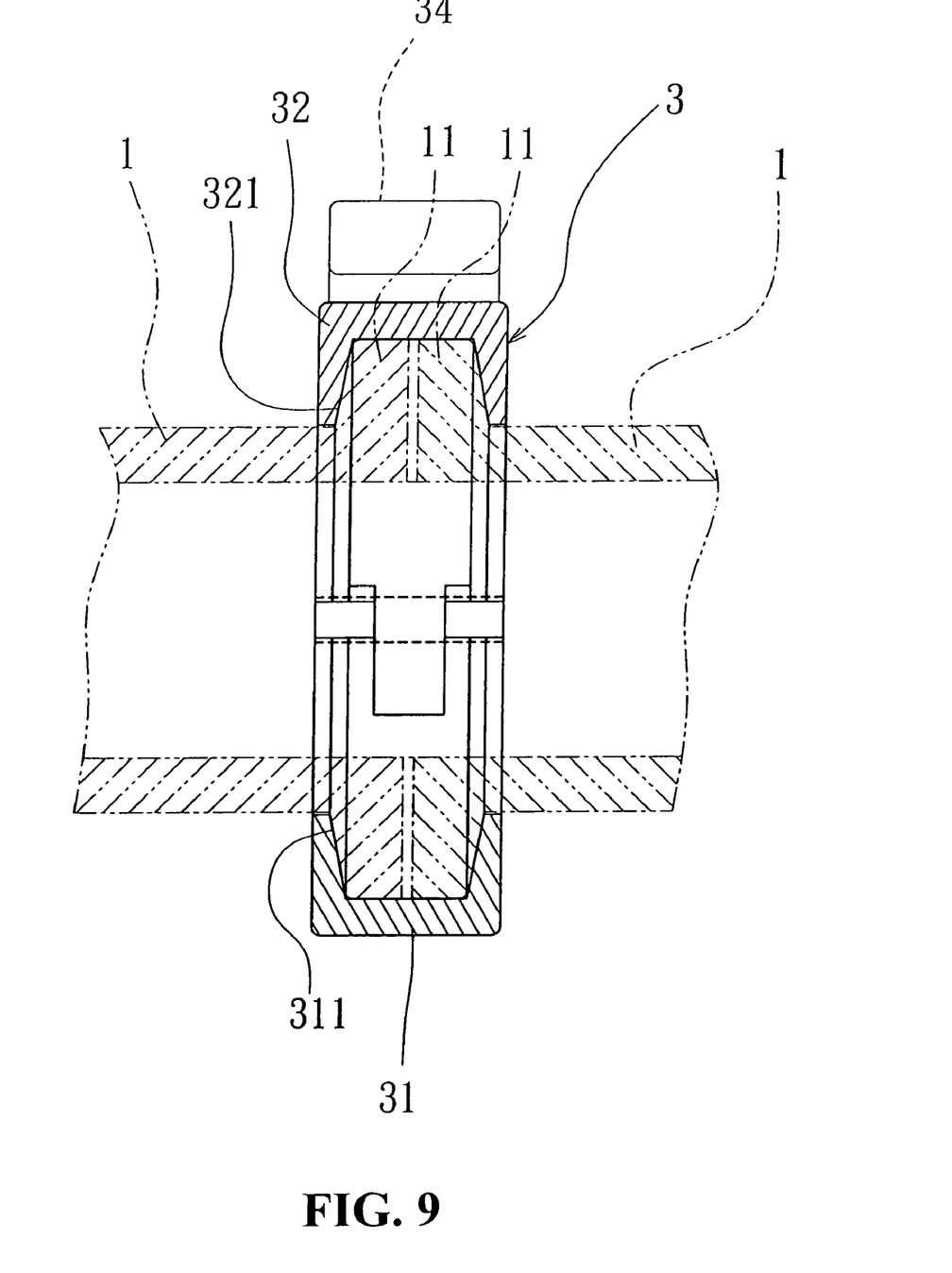
FIG. 9 is a sectional view of the tube clip of the present invention.
Figure 10:
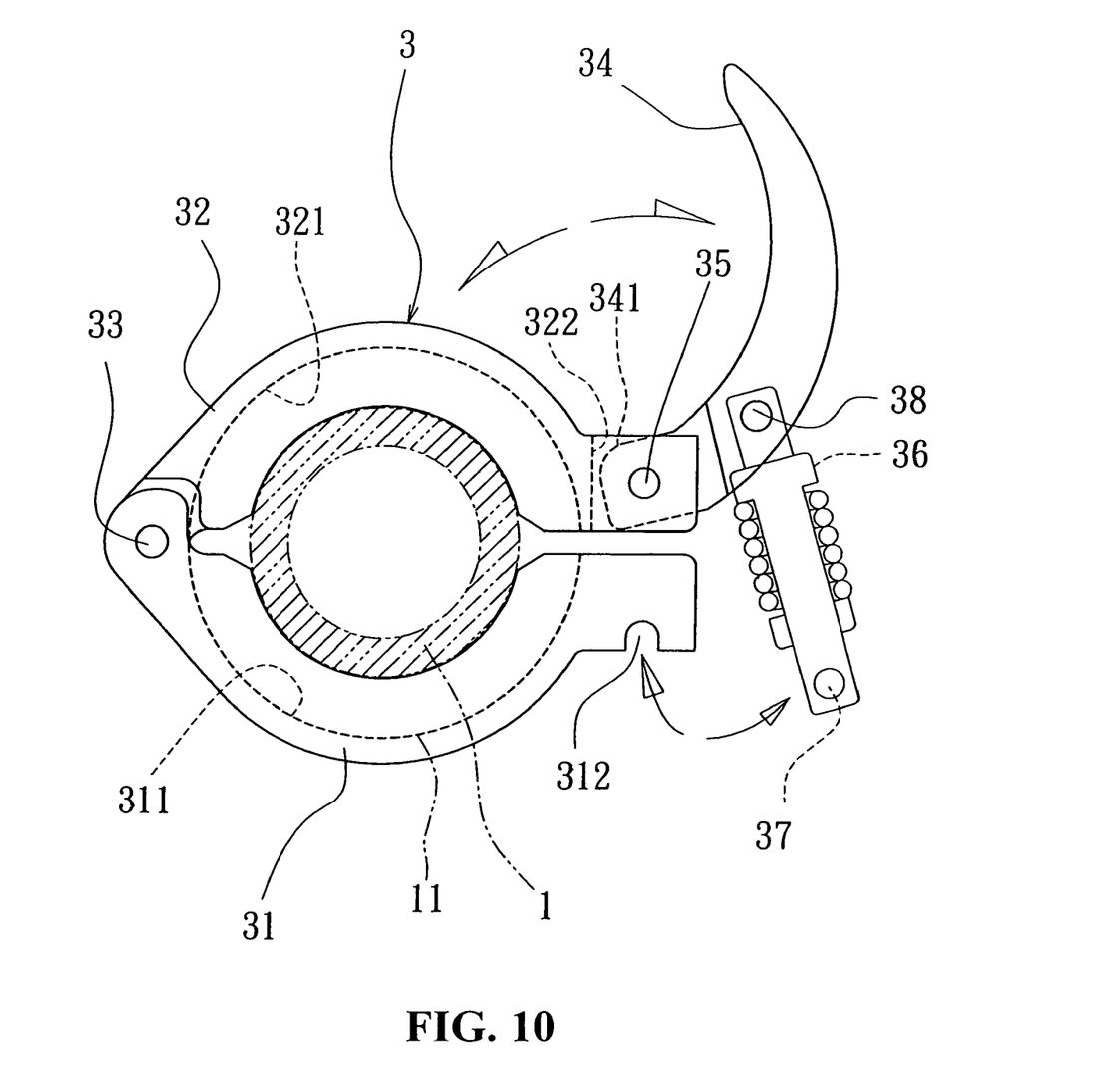
FIG. 10 is a schematic view showing the releasing of the clip tube of the present invention.

Referring to FIGS. 7, 8 and 9, there is shown a perspective view, side elevation view, and sectional view of a tube clip structure of the present invention. The tube clip 3 comprises a lower clipping body 31, an upper clipping body 32, a pulling plate 34 and an elastic member 36. The internal sides of the lower clipping body 31 and the upper clipping body 32 are respectively provided with a lower clip ring 311 and an upper clip ring 321 to urge the protruded edge 11 of the tube body 1. A clip body pivotal rod 33 is used to connect the lower clip ring 311 and the upper clip ring 321 so that the lower clipping body 31 and the upper clipping body 32 can be opened and/or closed. The other side of the ring 321, 311 is provided with a lower clipping body 31 having a lower end provided with a lower fastening slot 312. The external end of the upper clipping body 32 has an upper pivotal slot 322 and within the slot 322, a pulling plate 34 having a pivotal block 341 at the bottom thereof is secured with a plate pivot 35. The pulling plate 34, near to the pivotal block 341, is pivotally connected with an elastic member 36 by a pulling plate peg 38. The lower end of the elastic member 36 is provided with a fastening rod 37. As shown in FIG. 7, the two sides of the pulling plate 34 are provided with an elastic member 36 and the bottom end thereof is provided with a fastening rod 37. For fastening/releasing, the pulling plate 34 is reversed, as shown in FIG. 10 and at this point, the fastening rod 37 can be easily mounted to the bottom end at the external of the lower clipping body 31. That is the fastening rod 37 is mounted at the lower fastening slot 312, and the pulling plate 34 is reversed to the other direction that is the protruded section of the upper clip body 32 is depressed and at this point, the other pulling plate peg 38 is moved to the inner side of the pulling plate pivot 35, as shown in FIGS. 7 and 8. The pulling plate 34 will move up without dislocation. The pulling plate peg 38 is moved to the outer side of the pulling plate pivot 35, as shown in FIGS. 8, 9 and 10, the protruded edge 11 will urge the lower and upper clipping ring 311 and 321.

Figure 11:
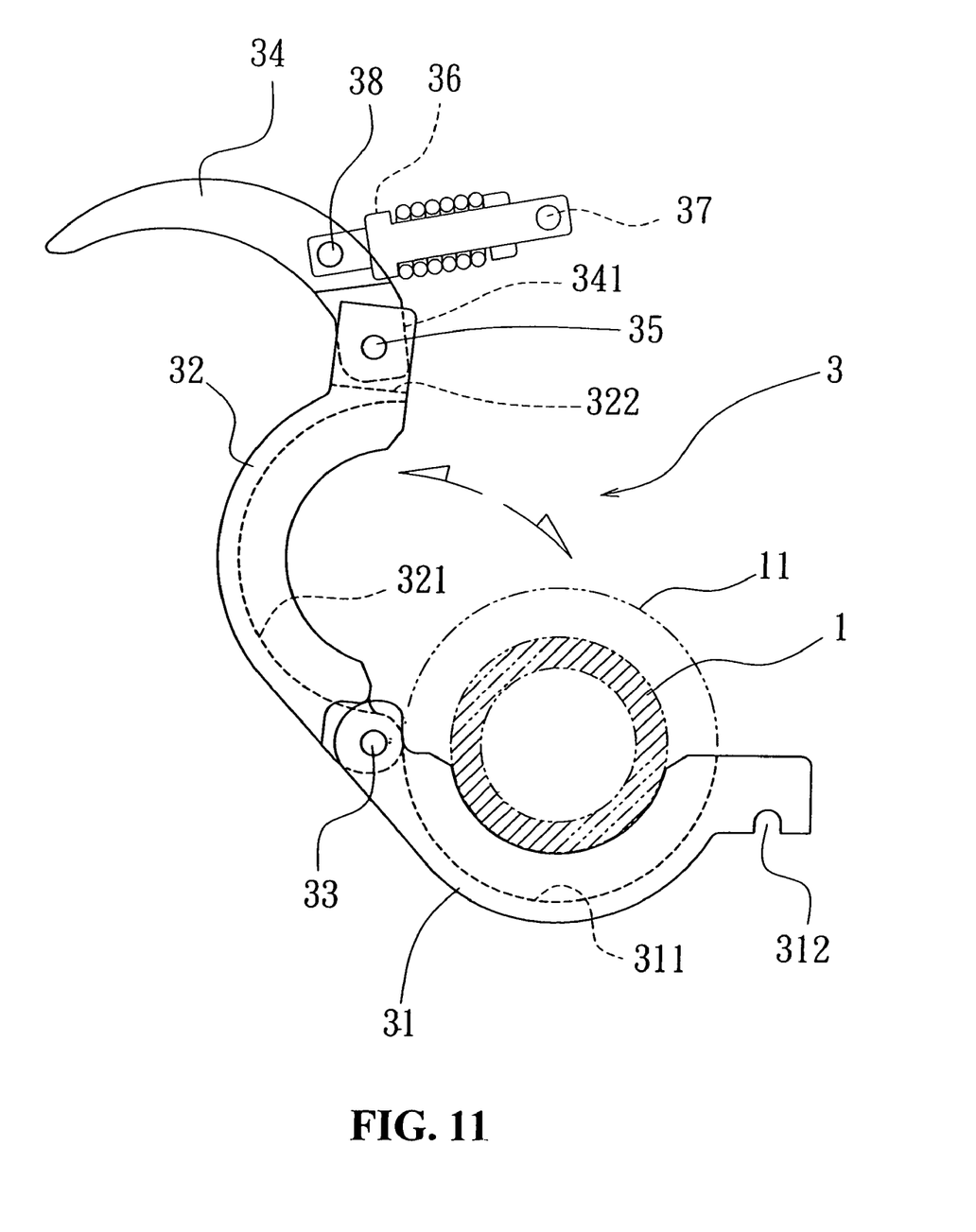
FIG. 11 is a schematic view showing the opening of the tube clip of the present invention.

As shown in FIGS. 10 and 11, there is shown the releasing and lifting of the tube clip structure. When the pulling plate 34 is to be released, the pulling plate 34 is upwardly moved, the pulling plate peg 38 is moved outside, and the urged elastic member 36 will be extended and the pulling plate peg 38 is moved beyond the pulling plate pivot 35. At this point, the fastening rod 37 is dislocated from the lower fastening slot 312, and the upper clip body 32 is opened about the pivotal rod 33, as shown in FIG. 11. At this instance, the clip 3 is dislocated from the protruded edge 11. The reverse procedures are implemented in order to fasten a tube body. As shown in FIG. 7, the elastic member 36 can be formed from two T-shaped fastening plates 361 arranged in opposite directions. Each of the T-shaped fastening plates 361 has a T-shaped head. An elastic body 362 is mounted between the two T-shaped heads of the T-shaped fastening plates 361.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A tube clip comprising:
   a lower clipping body having a lower clip ring, said lower clipping body having a first end and a second end, said second end having a lower fastening slot;
   an upper clipping body having an upper clip ring, said upper clipping body having a first end pivotally connected with said first end of said lower clipping body by a clip body pivotal rod, said upper clipping body having a second end formed with an upper pivotal slot,
   a pulling plate having a pivotal block fitted in said upper pivotal slot and pivotally connected with said second end of said upper clipping body; and
   two elastic members each including two T-shaped fastening plates arranged in opposite directions, each of said T-shaped fastening plates having a T-shaped head, an elastic body mounted between T-shaped heads of said T-shaped fastening plates, said elastic members having a first end pivotally connected to said pulling plate by a pulling plate peg close to said pivotal block of said pulling plate, said elastic members having a second end provided with a fastening rod engageable with said lower fastening slot of said lower clipping body.

* * * * *